United States Patent [19]
Hallden-Abberton et al.

[11] Patent Number: 5,186,993
[45] Date of Patent: Feb. 16, 1993

[54] POLYMER BLENDS

[75] Inventors: Michael P. Hallden-Abberton, Maple Glen, Pa.; William L. Wills, Roebling, N.J.

[73] Assignee: Rohm and Haas Company, Philadelphia, Pa.

[21] Appl. No.: 776,542

[22] Filed: Oct. 11, 1991

[51] Int. Cl.$^5$ .................. C08L 51/00; C08L 33/04; C08L 25/04; C08L 25/14
[52] U.S. Cl. .................. 428/36.92; 525/84; 525/85; 525/221; 525/222; 525/241; 525/902
[58] Field of Search ............ 525/84, 85, 221, 222, 525/241, 902; 428/36.92

[56] References Cited

U.S. PATENT DOCUMENTS

| | | | |
|---|---|---|---|
| 3,887,652 | 6/1975 | Carrock et al. | 260/880 |
| 3,900,528 | 8/1975 | Beer | 260/876 |
| 4,046,839 | 9/1977 | Papetti | 260/880 |
| 4,228,256 | 10/1980 | Schmitt | 525/302 |
| 4,242,469 | 12/1980 | Schmitt et al. | 525/71 |
| 4,263,420 | 4/1981 | Bracke | 525/315 |
| 4,308,354 | 12/1981 | Jung et al. | 525/84 |
| 4,330,641 | 5/1982 | Echte et al. | 525/310 |

FOREIGN PATENT DOCUMENTS

| | | |
|---|---|---|
| 265142A2 | 10/1987 | European Pat. Off. |
| 840153 | 7/1960 | United Kingdom |

*Primary Examiner*—James J. Seidleck
*Assistant Examiner*—W. R. H. Clark
*Attorney, Agent, or Firm*—Richard A. Haggard; Terence P. Strobaugh

[57] ABSTRACT

The invention is directed to clear polymer blends of acrylic/vinyl aromatic copolymers with certain core-shell polymer impact modifiers. The core-shell modifiers have lightly crosslinked, predominantly diolefinic rubbery cores and one or more hard shells.

15 Claims, No Drawings

POLYMER BLENDS

FIELD OF THE INVENTION

This invention relates to clear polymer blends of acrylic/vinyl aromatic copolymers and impact modifier polymers wherein the impact modifier polymers are core-shell polymers having a lightly crosslinked, predominantly diolefinic rubbery core, at least one hard shell, and average particle diameters of less than about 400 nanometers. The polymer blends of the invention are substantially clear and have unexpectedly good impact strength.

BACKGROUND OF THE INVENTION

Several methods are known in the art to achieve impact modification of vinyl aromatic homopolymers and copolymers. Each method has some disadvantage. For example, it is known to dissolve an elastomeric polymer (elastomer) in a vinyl monomer mixture and to polymerize the mixture in the presence of the dissolved elastomer. Commercial high-impact polystyrene (HIPS) and some impact modified acrylonitrile-styrene-butadiene (ABS) resins are prepared by this method. This method affords modifiers having grafted rubbery particles of broad size distribution in the range of 1 to 5 micron (1000-5000 nanometers, nm) average particle diameter. Some workers consider such relatively large particle size modifiers to be necessary to afford the best impact properties in aromatic polymer blends, however, particle sizes greater than about 400 nm are highly detrimental to clarity of the blends, due to the sensitivity of visible light scattering to particle size in this particle size range.

To achieve clear formulations based on the bulk elastomeric polymer technology, acrylic/vinyl aromatic copolymers usually are polymerized in the presence of the elastomer, with monomers chosen to match the index of refraction of the elastomer (rubber) phase. This type of processing generally goes through a phase-inversion stage leading to a broad distribution of rubber particle sizes, or of domain (groups of particles) sizes, and consequently poor optical clarity. An example of this technology, such as by Jung (U.S. Pat. No. 4,308,354), describes typical rubber domain size distributions of 200-1,500 nm. Some examples (such as by A. Echte, et. al., in U.S. Pat. No. 4,330,641) require large domain size (equal to or greater than 3,500 nm) and high rubber levels (>28 wt. %, based on total blend weight) to achieve good impact properties. Another reference (M. Starzak, B. Motysia, and M. Durak, Polyimery (Warsaw), 20, 596 (1975); CA: 85(8) 47,377Y) describes a process in which a "powdered butadiene rubber" is suspended in monomer and the monomer polymerized. After polymerization, the mixture is converted to an aqueous suspension. This type of processing also would be expected to give large rubber domains or agglomerates, and consequently poor optical properties.

In order to use a rubber-based modifier particle of smaller particle size (for example, less than about 400 nm.) for good optical clarity while still maintaining good impact values, many workers found it necessary to incorporate acrylonitrile, or other nitrile-containing vinyl comonomers (for example in clear ABS blends or formulations). However, acrylonitrile (AN) use is known to increase inherent yellowness and heat-aging yellowing properties of a blend to such a point as to be an undesirable solution when clarity and low yellowing are the sought properties. A representative example of this problem is described in U.S. Pat. No. 3,900,528 (L. Beer) which discloses AN/vinyl aromatic matrices modified with an AN-containing, 2-stage modifier having a methacrylate/butadiene/styrene (MBS) core, giving blends which typically show ASTM yellowness indices of about 20-50. Similarly, U.S. Pat. No. 4,046,839 (S. Papetti), discloses clear ABS formulations prepared by polymerizing styrene/acrylonitrile in the presence of a butadiene (Bd) latex in a process which converts the Bd latex to a suspension. In that process, polymerization of the monomer produces both a matrix polymer and an outerstage, or outer shell, on the Bd core. Since the comonomers are present in great excess over the number of rubber modifier particles, very high levels of outer shell are obtained on the rubber modifier particles. Accordingly, AN is incorporated into both matrix and modifier polymer and again results in a yellowness problem.

Attempts to make low-yellowness, impact modified, acrylic/vinyl aromatic polymer blends without the use of AN or other nitrile-containing monomers or polymers, while simultaneously maintaining a small, uniform particle size rubber impact modifier (for example, a latex-derived particle), are also known in the art. For example, F. Carrock and K. Chu (U.S. Pat. No. 3,887,652) disclose a process in which a monomer mixture is first grafted to a Bd rubber latex particle, then suspending agent is added, and more monomer is added which, after polymerization, converts the latex to a suspension bead product. This type of process, agglomerating the modifier particle into larger aggregates, gives improved impact but poor optical clarity. Another reference (J. Schmitt, U.S. Pat. No. 4,228,256) discloses a process for sequentially "outerstaging" a Bd latex particle with, for example, 5% methyl methacrylate (MMA; Stage I), then 20% styrene (Sty; Stage II). The resulting modifier polymer is blended with a MMA/styrene/ethyl acrylate matrix copolymer at a level to give 15 wt. % butadiene based on the total blend weight, which blend gave a sample having a notched Izod impact of 1.6 (ft-lb/in.), an ASTM have value of 11%, and an ASTM yellowness index of 13.0. These results indicate that modest impact was achieved, but optical properties were still far from optimum. Similarly, J. Schmitt and R. Quinn (U.S. Pat. No. 4,242,469) disclose compositions of acrylic/vinyl aromatic copolymers containing a mixed impact modifier blend containing a Bd core with at least two different levels of "grafted outerstage." This combination gave improved impact properties, but at the expense of optical properties which were even poorer than in the '256 disclosure.

A. Berzinis and W. Wills, in European Patent Application 265,142, disclose core-shell modifiers useful in styrenic polymers and copolymers. The Berzinis/Wills modifiers have lightly crosslinked (high swell index) rubber cores, at least one hard polymer shell of defined compositions, and are in the form of particles having an average diameter less than 250 nm and the particles have a toluene swell index of from 13 to 45. However, the polymer blends prepared from these broadly disclosed modifiers are of much reduced clarity and without the optimum impact levels discovered in the polymer blends of this invention.

Thus, past methods for the impact modification of vinyl aromatic homopolymers and copolymers have one or more disadvantages. One of the objects of this invention is to provide polymer blends of an acrylic/vinyl aromatic matrix polymer with an impact-modifying rubber particle having an average particle diameter smaller than about 400 nanometers, which blends are substantially clear. It is a further object to provide blends having good light transmittance, low light scattering, and low intrinsic yellowness (in the absence of toners, dyes, or optical brighteners), without the need for other modification, such as heterogenous modifier outerstages or mixtures of different outerstage levels. It is a further object of this invention to give a useful level of impact modification without requiring the use of a nitrile-containing comonomer in either the matrix or modifier polymer. Another object is to provide polymer blends having, where desired, increased degrees of heat resistance and distortion resistance while achieving one or more of the former objects.

SUMMARY OF THE INVENTION

It has been discovered that particular combinations of composition and relative amounts of a relatively hard shell on a crosslinked rubbery core of a conjugated diolefin polymer or copolymer having a swell ratio (or "swell index," to be described) within defined limits, when admixed with acrylic/vinyl aromatic copolymers of matched index of refraction, result in polymer blends meeting one or more of the above stated objects. Thus, by suitably varying the core swell ratio and grafted outerstage (shell) polymer level and compositions by procedures and amounts to be described herein, certain ranges have been found which unexpectedly, and simultaneously, optimize room temperature and low temperature notched Izod, falling dart, and tensile properties while simultaneously maintaining low haze, low yellowness, and high light transmittance. Additionally, good heat resistance can be achieved without sacrificing these properties in certain combinations.

The core-shell polymers have a core of crosslinked, conjugated diolefinic polymer or copolymer, such as a crosslinked copolymer of butadiene and styrene, having at least one outer shell of a copolymer of a vinyl aromatic comonomer, for example, styrene or alpha-methyl styrene, and an acrylic or methacrylic ester, for example, methyl methacrylate. Specific to the invention are requirements that the outer shell (or shells) contains from about 5 but no more than about 30 weight percent of the total weight of the core-shell polymeric modifier, and that the diolefinic core has a swell ratio (as measured in toluene by a method described below) of at least about 7 to about 35.

Acrylic/vinyl aromatic matrix copolymers resulting from the polymerization of, for example, acrylic or methacrylic monomers and styrene or alpha-methylstyrene, are particularly responsive to the clarity and impact improving core-shell polymers of the invention.

The polymer blends of the invention are produced by admixing the matrix copolymer with particles of the core-shell polymer and further mixing the polymeric mixture to form a polymer blend, typically in melted form using a standard thermoplastic mixing device. The blends also may be produced by premixing the components in their latex, or emulsion, form prior to isolation of the mixed components, according to methods described below, then co-isolated and further treated in a standard thermoplastic mixing device. From the melt form, the mixed blend is generally cooled and isolated, usually in a pellet form, or alternately may be molded from the melt form directly into an article by compression, film extrusion, blow molding, injection molding, and other similar processes.

The polymer blends of the invention are useful in molded or extruded parts, such as in automobile parts, computer and appliance housings, blow molded articles such as bottles, heat-resistant engineering thermoplastics, consumer products and other devices further exemplified below, where low-haze, essentially clear articles with good impact resistance are particularly desireable.

DETAILED DESCRIPTION OF THE INVENTION

In accordance with the invention, a polymer blend is provided which comprises
a) from about 55 to about 95 weight percent of an acrylic/vinyl aromatic matrix copolymer, and
b) from about 5 to about 45 weight percent of particles of a core-shell polymer comprising
   i) a core of from about 70 to about 95 weight %, based on the core-shell polymer weight, of a crosslinked polymer derived from at least 50 weight %, based on the core, of a conjugated diolefin monomer, up to about 50 weight % of at least one vinyl comonomer, and up to about 5 weight % of a polyvinyl monomer, the core having a toluene swell ratio of from about 7 to about 35, and
   ii) at least one polymer shell of from about 5 to about 30 weight %, based on the core-shell polymer weight, of a polymer derived from at least one vinyl aromatic monomer or of a copolymer derived from a vinyl aromatic monomer and at least one comonomer selected from a vinyl aromatic, a lower alkyl acrylate, a lower alkyl methacrylate, or a polyvinyl monomer; wherein the core-shell particles have an average particle diameter less than about 400 nanometers and wherein the polymer blend has a luminous transmittance greater than about 85%.

The terms "polymeric modifier," "impact modifier," or "modifier," as used herein, synonomously mean a polymeric composition that is used to modify the properties of other polymeric compositions often termed "matrices" or "matrix polymers or copolymers". Also as used herein, and as used generally in the art, the slash mark ("/") is employed to indicate that the copolymers so described result from the copolymerization of the indicated monomers. A double slash ("//") is employed conventionally to indicate blends, or different polymer "stages," of those components separated by the double slash. The term "(meth)", as applied for example in the word "(meth)acrylic", is a convention widely used in the art and herein, to denote "acrylic or methacrylic." The term "acrylic" also is widely used in the art and herein, unless further defined, to denote either of, or both, "acrylic and methacrylic;" where distinction "acrylic and methacrylic" is critical, distinction is made.

The acrylic/vinyl aromatic matrix copolymers useful in the invention are the copolymers derived from vinyl aromatic monomers and certain acrylic esters. Alkyl (meth)acrylic esters, wherein the alkyl group is lower alkyl of from 1 to 8 carbon atoms, are particularly useful. One or more of the lower alkyl (meth)acrylic esters may be used in the matrix copolymer. Lower alkyl (meth)acrylates having 1 to 4 carbon atoms in the alkyl group are preferred. Especially useful among the vinyl aromatic monomers are styrene, vinyl toluene (e.g., para-methyl styrene), and the alpha-alkyl styrene monomers, especially alpha-lower alkyl styrene monomers, wherein the lower alkyl has from 1 to 8 carbon atoms. Monomers of styrene and alpha-methylstyrene are preferred. A few examples of acrylic/vinyl aromatic matrix copolymers useful in the blends of the invention include copolymers of methyl methacrylate(MMA)/styrene(Sty); MMA/alpha-methylstyrene(alpha-MSty); MMA/Sty/alpha-MSty; MMA/alpha-MSty/ethyl acrylate(EA); MMA/Sty/alpha-MSty/EA; MMA/para-methyl styrene; and MMA/para-methyl styrene/alpha-MSty. Preferred matrix copolymers for blending with the core-shell polymers of the invention are prepared from acrylic or methacrylic monomers, or a combination of acrylic and methacrylic monmers, which are copolymerized with alpha-alkylstyrene monomers. Particularly preferred are blends containing matrix copolymers of alpha-methylstyrene, MMA, and a lower alkyl acrylate. The polymeric modifiers of the invention are broadly described as "core-shell" polymers, as is more specifically defined below. The core-shell polymers include a crosslinked polymeric core of a "rubbery" nature, described more fully below, and at least one relatively harder outer shell, as described more fully hereinbelow. Core-shell polymers derived from methacrylate, butadiene, and styrene monomer combinations are commonly described in the art as "MBS" polymers. Certain types of MBS polymers are effective in the invention, within the limitations described herein. As is more fully described below, the extent of crosslinking of the core and the amount of outer shell on the core are controlled to vary the extent of improvement imparted by the modifier to the matrix polymer. The amount of the core-shell polymer used in the acrylic/vinyl aromatic matrix copolymers of the invention also is controlled, it having been found that from about 5 to about 45 weight percent of the former is effective.

The rubbery core of the core-shell polymeric modifiers of the invention is crosslinked and includes polymers or copolymers of conjugated diolefins such as butadiene, isoprene, chloroprene, dimethylbutadiene, and the like, and from 0 to about 5 weight % of a polyvinyl monomer. Preferably, the core includes butadiene. The core polymer may be composed of copolymers of conjugated, diolefinic monomers which also may be copolymerized in the presence of up to about 50 weight %, based on the weight of the core, of at least one vinyl comonomer. Vinyl monomers effective in the core polymer include, for example, lower alkyl acrylate and lower alkyl methacrylate monomers, and also may include vinyl aromatic monomers, for example, styrene, alpha-methyl styrene, and other lower alkyl styrene monomers, and para-methyl styrene. Especially preferred is a butadiene core copolymer of butadiene and methyl methacrylate and, optionally, one or more of the mentioned vinyl monomers. The vinyl monomers may be used in combination, in amounts up to a total of about 50 weight % of the core weight, with the conjugated, diolefinic monomers, or no additional vinyl monomer may be used. A crosslinked core polymer predominantly of butadiene has been found to be highly effective in the invention.

Methods for crosslinking the core polymer are well known in the art, such as by the conventional use of crosslinking monomers, herein termed polyvinyl monomers, or through control of polymerization temperature, initiators, regulating agents, and chain transfer agents. Examples of known polyvinyl monomers which may be employed to crosslink the core include polyethylenically unsaturated monomers, such as divinyl benzene, trivinylbenzene, ethylene glycol dimethacrylate, butylene glycol dimethacrylate, trimethylolpropane trimethacrylate, diallylmaleate, vinyl isocyanurates, and the like. Chain transfer agents also may be used, with or without the use of crosslinking agents, to moderate the degree of crosslinking. Examples of chain transfer agents include alkyl mercaptans, such as n-dodecyl mercaptan, n-octyl mercaptan, tertiary-butyl mercaptan, and the like. When a polyvinyl monomer or other crosslinking control agent is used in the core polymer composition, the weight percent of the at least one vinyl comonomer is adjusted accordingly to give a core weight of 100%, including the polyvinyl monomer weight.

A key requirement of the invention is the extent of crosslinking of the core polymer. Since the extent of crosslinking may not be readily measured directly, a secondary parameter, the toluene swell ratio, or toluene swell index (TSI), is used to estimate the extend of crosslinking. The toluene swell index (TSI) is defined as the ratio of the weight of toluene-saturated polymer to the weight of the dry polymer. The TSI of a polymer relates inversely to the degree of crosslinking in the polymer. (Measurement of the TSI is described in the swell index measuring procedure preceding Example 1.) It has been discovered that unexpectedly good impact modification and clarity are achieved in blends with the matrix polymers of this invention when the toluene swell ratio of the core of the core-shell polymer is controlled to range from about 7 to about 35. Depending on other factors, for example on the composition and amount of the shell, preferable swell ratios are from about 7 to about 30 and from about 10 to about 25. A highly preferable swell ratio range is from about 12 to about 20 when, for example, the shell weight ranges from about 15 to about 22 weight % of the core-shell polymer weight. As will become appreciated by further description of the invention, the choice of the swell ratio for optimum results in the polymer blends depends upon one or more factors, for example, the shell amount and composition and the particular matrix copolymer composition.

That relatively lightly crosslinked cores of the invention, i.e., of cores measuring above about 7 in their TSI, are quite efficient in their impact properties may be considered surprising in view of Russell's teaching in U.S. Pat. No. 4,371,663 that increased crosslinking (corresponding to lower TSI) tended to improve impact resistance. As is shown below, the opposite effect is found with the core-shell polymers of the invention in the matrixes described, wherein improved impact resistance tends to result with decreased crosslinking (corresponding to higher TSI).

It has been found that the amount of the above described crosslinked polymer "core," or "first stage," must be at least 70 weight % of the combined core-shell polymer weight to be effective with the matrix copolymers of the invention, and that a maximum core weight of about 95 weight % of the core-shell polymer weight may be used. Effective weight percentage uses of the core depend on several factors, such as, for example, the composition and amount of the at least one shell, the level of crosslinking (as measured by the TSI), and the composition of the matrix copolymer. The relative amounts of core, shell, core-shell polymer and matrix, and TSI will become apparent by the examples and descriptions of use of the invention, below.

Surrounding the core polymer are at least one polymer "shell," or "outer stage." At least one of the polymer shells is a polymer derived from at least one vinyl aromatic monomer, or the shell may be a copolymer derived from at least one vinyl aromatic monomer copolymerized with another vinyl aromatic monomer, one or more lower alkyl (meth)acrylate monomers, and, optionally, a polyvinyl monomer. The shell composition may be adjusted to facilitate a refractive index matching with the acrylic/vinyl aromatic matrix copolymer. The shell copolymers encompassed contain units derived from monomers such as styrene and alpha-alkylstyrene monomers, and acrylic, methacrylic, and alpha-alkyl acrylic esters, wherein the alpha-alkyl and the ester alkyl group are lower alkyl, that is alkyl having from 1 to 8 carbon atoms. Some examples of the acrylic and methacrylic esters include methyl (meth)acrylate, ethyl (meth)acrylate, n-, iso-, or tert-butyl (meth)acrylate, 2-ethylhexyl (meth)acrylate, n-octyl (meth)acrylate, and the like. A preferred lower alkyl methacrylate for use in a shell is methyl methacrylate.

Particularly advantageous polymer shells on the core of the core-shell polymer comprise copolymers of methyl methacrylate and styrene, methyl methacrylate and alpha-methyl styrene, and methyl methacrylate, styrene, and alpha-methyl styrene. It is preferred to have a vinylaromatic monomer content of at least 10 weight %, and up to about 50 weight %, of the polymer shell weight. Also preferred is a copolymer of styrene and at least one of either alpha-methyl styrene or methyl methacrylate. Most preferred in the polymer shell is a copolymer of about 65-75% methyl methacrylate and about 25-35% styrene.

In accordance with the invention, the amount of shell polymer, as a percentage of the total core-shell polymer modifier, is controlled in accordance with the swell index of the rubbery core polymer to vary the extent of improvement of impact properties imparted by the modifier. For example, a core-shell polymer with higher swell index core generally tolerates greater amounts of outer polymer shell than does a core-shell polymer with lower swell index, before losing its ability to improve the impact properties of a polymeric matrix. Amounts of shell polymer which are effective in the invention are found to range from about 5 to about 30 weight %, based on the combined weight of core and shell. Preferably, the shell is from about 12 to about 25 weight % when the toluene swell index is from about 10 to about 25, and most preferably, the shell is from about 15 to about 22 weight % of the core-shell polymer when the toluene swell index is from about 12 to about 20.

As mentioned, more than one shell may be present in the core-shell modifier polymers. Additional polymer shells contain vinylaromatic polymers or copolymers which contain one or more monomers from among vinylaromatic, methyl methacrylate, alkyl acrylate having alkyl from 1 to 8 carbon atoms, and, optionally, crosslinked with an unsaturated crosslinking polyvinyl monomer such as, for example, divinylbenzene, trimethylolpropanetriacrylate, and others of those monomers described as useful for crosslinking the core polymer. The amount of one or more shell (or outer stage) polymer added to the core to produce the core-shell polymer is controlled simply by controlling the amount of monomer or monomers added during the outer stage, or shell polymer stage, polymerization relative to the amount of those monomers used during the core polymerization. The combined amount of the at least one shell polymer and additional polymer shells nevertheless should remain within about 5 to about 30 weight % of the total weight of the core-shell polymer for most effective uses.

The core-shell polymers of the invention can be prepared by a variety of methods known in the art, for example, by emulsion polymerization wherein the monomers of the core and shell are polymerized in an aqueous medium which contains appropriate surfactants, initiators, micelle regulators, and other typical emulsion polymerization additives well known in the art. The core may be prepared by the use of a "seed/growout" method, wherein a small fraction of the core weight, typically less than 10 wt. %, of particles of a "seed" polymer are employed to establish controlled particle concentration in emulsion and on which seed particles the remainder of the core is polymerized. The seed particles may be of identical, or of different, composition to the remaining, predominant compositional content of the core. Emulsion polymerization methods have been used to prepare the core-shell polymers of the invention; they are preferred and are exemplified below. The various monomers employed to form the core-shell polymers of the invention may be polymerized by either batch, gradual addition, or continuous methods, or a combination of these methods, as are well known in the art. Additional materials such as antioxidants, optical brighteners, colorants, UV stabilizers, and the like may be incorporated into the emulsions. Also, reactive (e.g. peroxidic, hydrazidic) light stabilizers, such as hindered amine light stabilizers, and antioxidants may be incorporated during polymerization of the core and/or shell components of the core-shell polymers.

The core-shell polymers may be isolated from their emulsions (also termed "latexes" or "latices") by well known methods such as by evaporation, coagulation, spray drying, freeze drying, coagulation/dewatering/extrusion, and the like, to provide isolated particles of the core-shell polymers. Typically the particles of the core-shell polymers, in either their emulsion or isolated form, have average diameters smaller than 400 nanometers. Effective core-shell polymers typically can have an average particle diameter of from about 70 to about 400 nanometers. Besides typical methods used in the art for control of particle size, i.e. surfactant level control, monomer charge levels, and the like, particle size also may be controlled by the use of so-called "partial agglomeration" techniques. For example, a surfactant of a carboxylic acid salt can be used in the preparation of a rubber core or core/partial shell polymer under basic conditions (e.g. pH 9-11), followed by pH adjustment to a lower pH range (e.g. pH 4-7). At this point, additional shell then may be polymerized onto the resulting agglomerated particle structure, growing the core-shell polymer to the size desired.

The core-shell polymers may be used also with matrix polymers and copolymers other than those already discussed. Examples of other matrices useful in the invention include MMA/alpha-methyl styrene/AN terpolymers; Sty/AN copolymers; ABS; polycarbonates, polyethylene terepthalate, polystyrene, imides, polyvinylchloride, polyvinylhalides, polyamides, polycarbonate and ABS blends, polycarbonate/polybutadiene terepthalate blends, polycarbonate/nylon blends, and nylon/ABS blends. The core-shell polymers of the invention are particularly useful in polyglutarimides, and blends of polyglutarimides with the above polymers.

As previously mentioned, the polymer blends may be further treated in any standard thermoplastic mixing device. Typically from the melt form, the polymer blend is cooled and isolated, usually in pellet form for further use, or alternately may be molded from the melt form directly into a useful article by compression, film extrusion, blow molding, injection molding, and other similar processes. Alternatively, the cooled polymer granule, pellet, or mass may be molded, cast, extruded, or melt-blended with other polymers, such as compatibilizing polymers, other additives, stabilizers, fillers, pigments, blowing agents, and so forth in the same or in a separate, secondary process.

The polymer blends of the invention which incorporate the defined core-shell polymeric modifiers may be formed, as for example, by injection molding or extruding, into a variety of useful objects such as automotive parts, including ducts, grilles, knobs, switches and sockets, fasteners, interior door handles, ducts, doors and diverters for heaters and air conditioners, air cleaner trays, control brackets, glove box door buttons, and the like; as computer and appliance housings, refrigerator door compartments, egg trays, ice cube bins; as houseware furnishings such as cabinet doors, table and chair components, other furniture including, for example, drum tables, mirror frames, trim, underframes, louvers, shower doors and partitions, shutters, closet doors, architectural moldings, board and sheeting, and the like; as houseware and consumer products including hair-brush handles, kitchen utensil handles, letter trays, canister lids and caps, picnic trays and jugs, planters, room dividers, salt and pepper shakers, soap dishes, toilet seats, watering cans, telephone parts and the like; as electrical or electronic covers and components in business machines, components of air conditioners, stereo dust covers, TV and stereo cabinets, videotape cassettes. Other uses of the polymer blends of the invention include applications in medical equipment such as in filter housings, gamma-ray sterilizable equipment, blood oxygenators and reservoirs, diagnostic equipment, syringes, pipettes for aqueous solutions, urine cups, operating room canisters, Petri dishes, housings and connectors, and the like. The polymer blend products are also useful for producing blow-molded articles such as bottles, including bottles for toiletries, hand and body lotions, laxatives, medications, powders, and talcs; also such as fuel tanks, and the like. Other uses for these polymer blend products include heat resistant and solvent resistant engineering thermoplastics, electrical insulators and packaging, for example packaging for food and beverages, including coffee cups, vending drinkware, dairy product containers, lid stock, meat and poultry trays, trays, platters, bowls for food service, picnicware, and the like. Other items include school supplies such as pencil and crayon boxes, toys, camera parts, coat hangers, pushbuttons, indoor signs, and knobs. The blends may be formed into sheet, film, rod, profile, or complex parts by any known plastics processing technique, and can be painted, dyed, decorated, metallized, or coated with abrasion resistant coatings.

The polymer blends in the following illustrative, non-limiting examples are prepared by methods generally known in the art and as described in further detail hereinbelow.

EXAMPLES

General

Emulsion polymerization is a preferred method of preparing the core-shell polymers and is used in the following examples.

The copolymer matrices may be prepared by any one of many methods known in the art, however, their preparation in emulsion form allows premixing and additive addition and subsequent isolation to be carried out easily. Emulsion polymer blends are prepared by emulsion pre-mixing of the blend components, followed by isolation and use, described below.

Swell Index Measuring Procedure

The toluene swell ratio or toluene swell index (TSI) of the core is determined by weighing a small sample, typically 0.50 grams, of dry core polymer into a tared centrifuge tube to which is added 15 g of commercial grade toluene. The covered sample is shaken overnight at one room temperature to attain complete saturation with toluene. The resultant swollen sample is then centrifuged at 15,000 RPM for 2–4 hours. The supernatant layer is carefully decanted or pipetted off and the swollen polymer gel is weighed. The gel is then dried in a vacuum oven at 80 deg. C. for 16 hr to obtain the weight of the dry rubber core. The swell index is calculated by dividing the weight of the swollen sample by that of the dried sample.

Polymer Blending

Polymer blends for use in further testing are prepared by mixing the core-shell polymer and matrix copolymer emulsions in the amounts specified. Following mixing, the emulsion mixture is freeze-dried under vacuum (28 to 30 inches of vacuum) for 12 hours, and the resulting solid crumb is reduced to a rough powder and dried at 35 deg. C. for an additional 8 hours.

The dry, powdered blend is extruded through a Killion 2.5 cm., single screw, double vented, plasticating extruder with a barrel temperature of 218 deg. C. and at 120 RPM. The resulting polymer is cooled, pelletized, and dried at 70 deg. C. under vacuum (28 to 30 inches of vacuum) for 12 hours.

Test Specimen Preparation

Test specimens are prepared by injection molding the polymer pellets on a Newbury injection molding machine operating at a melt temperature of 218–232 deg. C. for the acrylic/alpha-methylstyrene matrix polymers, and injecting the test polymer into mold cavities cut to ASTM specifications and heated to 71 deg. C.. Test pieces for impact testing were conditioned at 50% relative humidity for 48 hours (ASTM D-618, Cond. A). Test pieces for heat distortion testing were annealed at 100 deg. C. for 4 hours in vacuum.

Tests the following tests are used to evaluate the properties of polymer blends.

Notched Izod impact strength is determined using $3.2 \times 12.7 \times 63.5$ mm ($\frac{1}{8} \times \frac{1}{2} \times 2.5$ inch) test specimens according to ASTM standard procedure D256.

Falling dart impact strength is measured by the Gardner falling dart test using an eight lb. dart. Failure is determined as the point at which 50% of the tested samples showed the first trace of a crack (using the Bruceton "staircase" method).

Tensile impact strength is measured according to ASTM Method D-1822.

Tensile properties are determined according to ASTM Method D-638 using a type 5 specimen bar.

Optical properties, haze and luminous transmittance, are measured according to ASTM Method D 1003, using a 3.2 mm thick plaque (50×75 mm), measured at the center of the plaque. Yellowness Index is measured by ASTM Method D 1925 using a Hunter Colorimeter.

Emulsion particle size is measured using a Brookhaven Instruments particle sizer (BI-90) and standard dilution techniques.

Distortion temperature under flexural load is measured according to ASTM D-648 using a stress level of 264 pounds per square inch.

Specific Examples

Examples 1–4 describe methods for preparing core-shell polymer modifiers of the invention and several comparative samples, all of which contain a crosslinked core predominantly of butadiene and an outer stage, or shell, of methyl methacrylate/styrene copolymer. Example 5 describes the preparation of an acrylic/vinyl aromatic matrix copolymer used in making and testing the polymer blends of the invention. Later examples describe the dispersing of particles of a core-shell polymer impact modifier into the copolymer matrix of Example 5, which matrix is matched in index of refraction (at 23 deg. C.) to the refractive index of the core-shell impact modifier by adjusting the modifier and matrix compositions so that there is less than 0.0050 refractive index units ($n_D$) difference at room temperature. Subsequent examples describe useful and effective combinations and properties of resulting polymer blends, and other comparative examples.

EXAMPLE 1

Preparation of Rubber Cores

This example describes preparation of butadiene-based rubber cores having toluene swell index (TSI) values from 8.25 to 18.4.

EXAMPLE 1A

Preparation of Butadiene-Rich Core with TSI of 18.4

A butadiene-rich core is prepared by admixing 92 parts of deionized water, 0.455 parts of 50% aqueous sodium hydroxide, and 3.8 parts, on solids, of a 69.6 butadiene/28.2 styrene/2.2 methyl methacrylate "seed copolymer," prepared by conventional emulsion methods (the seed copolymer having a particle size of approximately 55–70 nm and a solids content of 25–40 wt. % in its aqueous emulsion form) into a stainless steel pressure reactor. The reaction vessel is sparged with nitrogen as the temperature is raised to 90 deg. C. at which time 90 parts of butadiene; a mixture of 5.62 parts of styrene monomer, 1.12 parts oleic acid, and 0.60 parts n-dodecylmercaptan; and a mixture of 0.200 parts sodium persulfate, and 0.200 parts sodium carbonate in 17.1 parts water are separately fed into the reactor vessel during a 7 hour period. After completion of the 7 hour feed, a mixture of 0.030 parts of sodium formaldehyde sulfoxylate, 0.0006 parts of ferrous sulfate (heptahydrate), and 0.0030 parts of ethylene diamine tetraacetic acid (di-sodium salt) in 2.86 parts water, is fed intor the reactor over 30 minutes. Then, a mixture of a second feed of 3.09 parts of methyl methacrylate, 1.29 parts of styrene, 0.80 parts of n-dodecylmercaptan, and 0.045 parts of 70% (aqueous) t-butyl hydroperoxide is fed linearly and continuously during a 2 hour period at 85–90 deg. C. After a 30 minute hold period, a mixture of 0.0071 parts of sodium formaldehyde sulfoxylate in 1.43 parts water is fed into the reactor during 5 minutes. Then, an additional chasing mixture of 0.0107 parts of 70% (aqueous) t-butyl hydroperoxide in 1.07 parts water is also fed to the reactor during a 2 hour period while cooling the reaction batch to 60 deg. C. to provide a butadiene-rich latex with a monomer-to-polymer conversion of at least 95% (determined by measurement of polymer solids.) Additionally, 27.3 parts of water is added to the reactor as rinses for various feed components. The swell ratio of the butadiene-rich polymer core thus prepared is 18.4 g/g.

EXAMPLES 1B–1E

Additional Core Polymers

Butadiene-based rubber cores of substantially identical composition, except for the mercaptan level used in controlling the degree of crosslinking, are prepared by the procedures of Example 1A. Table I lists Examples 1A–1E and shows the wt. % charges of n-dodecyl mercaptan used in the 7-hour feed period and in the subsequent 2-hr (second) feed period to accomplish the desired, and expected, variation in crosslinking density as shown by the TSI. As mercaptan level is reduced, the resulting TSI of the rubber core decreases, indicating increased crosslinking density.

TABLE I

Butadiene-Rich Cores of Varying Swell Ratio

| Example | n-DDM in Feed (%)[1] | n-DDM in 2nd Feed (%)[2] | TSI |
|---|---|---|---|
| 1A | 0.60 | 0.80 | 18.4 |
| 1B | 0.60 | 0.40 | 14.6 |
| 1C | 0.60 | 0.20 | 12.9 |
| 1D | 0.60 | 0.0 | 10.7 |
| 1E | 0.05 | 0.0 | 8.25 |

NOTES:
[1] N-Dodecylmercaptan, as wt. % of core weight, is included in the 7 hour (first) feed charge.
[2] N-Dodecylmercaptan, as wt. % of core weight, is included in the 2 hour (second) feed charge.

EXAMPLE 2

Core-Shell Polymer Preparations Using Cores of Example 1

(This example describes preparations of core-shell polymers using the cores of Example 1, onto which cores the outer stage, or shell, copolymer or copolymers are grown, or "outer staged," by the following procedure.)

EXAMPLE 2A

A core-shell polymer of an 80 wt. % butadiene core (1A) and a 20 wt. % outer shell of 70.8 wt. % MMA and 29.2 wt. % copolymer is prepared as follows. A mixture of 195 parts of the butadiene polymer core emulsion of Ex. 1A and 8.75 parts deionized water is added to a glass reactor at atmospheric pressure and the mixture is swept with nitrogen while heating to 60 deg. C. To the heated emulsion, a mixture of 14.2 parts of methyl methacrylate, 5.8 parts of styrene, 0.095 parts of cumene hydroperoxide, and a second mixture of 0.090 parts of sodium formaldehyde sulfoxylate, 0.0090 parts of ethylene diamine tetraacetic acid (disodium salt), 0.0018 parts of ferrous sulfate heptahydrate, and 15.2 parts of deionized water rinses are separately and continuously added during 1.5 hours at 60 degrees C. This mixture is maintained for one hour at 60 deg. C. to attain at least 95% conversion to polymer. The composition of the outer shell on the core of Example 1A is a copolymer of 70.8% methyl methacrylate/29.2% styrene. The outer shell is 20 weight % of the total core-shell polymer weight.

Examples 2B through 2F are prepared substantially by the same procedure used in preparing Ex. 2A. Each of the core polymer emulsions of Examples 1A through 1E, respectively, is used. Example 2A, as described above, incorporates an outer stage charge level yielding an outer shell of 20 wt. % based on total weight of the core-shell polymer. Examples 2B-2F core-shell polymers have outer shells which are prepared by polymerizing 15% by weight of the outer shell monomers described in Example 2A (based on total weight of the core-shell polymer) onto the rubber cores, 1A through 1E, respectively, thus providing an outer shell of 15 wt. %.

Examples 2G through 2K are prepared substantially by the same procedure used in preparing Ex. 2A. Examples 2G-2K core-shell polymers have outer shells which are prepared by polymerizing 25% by weight of the outer shell monomers described in Example 2A (based on total weight of the core-shell polymer) onto the rubber cores, 1A through 1E, respectively, thus providing an outer shell of 25 wt. %.

Table II summarizes the Example 2 series, made with the variable cores of Ex. 1 and three levels of wt. % outer shell: 15%, Ex. 2B-2F; 20%, Ex. 2A; 25%, Ex. 2G-2K.

TABLE II

Series of Core-Shell Polymers Having
Variable Cores and Fixed Wt. %
Outer Shell
(Outer Shell Composition is 71 MMA/29 Styrene Copolymer)

| Example | CORE | CORE TSI | OUTER SHELL (%)[1] |
|---|---|---|---|
| 2A | 1A | 18.4 | 20 |
| | | Outer Shell 15 WT. % | |
| 2B | 1A | 18.4 | 15 |
| 2C | 1B | 14.6 | 15 |
| 2D | 1C | 12.9 | 15 |
| 2E | 1D | 10.7 | 15 |
| 2F | 1E | 8.25 | 15 |
| | | Outer Shell 25 WT. % | |
| 2G | 1A | 18.4 | 25 |
| 2H | 1B | 14.6 | 25 |
| 2I | 1C | 12.9 | 25 |
| 2J | 1D | 10.7 | 25 |
| 2K | 1E | 8.25 | 25 |

NOTES:
[1]Outer shell % is weight % of total core-shell polymer weight.

EXAMPLE 3

Series of Core-Shell Polymers with Core 1A and Variable Wt. % Outer Shell

By following the same procedure of Example 2A and also using the butadiene core 1A, and appropriately varying the charge of the outer shell monomer mixture, but using the same 70.8 MMA/29.2 Styrene outer shell composition used in Ex. 2, the core-shell polymer of Example 3A is prepared, yielding a core-shell polymer with an outer shell weight percent of 10%. The series having Core 1A is summarized in Table III and includes related core-shell polymers from Example 2 having the same 1A core.

EXAMPLE 4

Series of Core-Shell Polymers with Core 1E and Variable Wt. % Outer Shell

By following the same procedure of Example 2A, but using the butadiene core 1E (a core with relatively low toluene swell index), and varying the charge of the outer shell monomer mixture, but using the same 70.8 MMA/29.2 Styrene outer shell composition used in Examples 2 and 3, the core-shell polymers of Examples 4A and 4B are prepared, yielding core-shell polymers with outer shell weight percents of, respectively, 10 and 20%. This series also is summarized in Table III and includes related core-shell polymers from Example 2 having the same core, 1E.

Each of the resulting butadiene-rich core-shell polymer emulsions of Examples 2 through 4 is stabilized by adding, based on 100 parts of the core-shell polymer content, a mixture of 0.40 parts of octadecyl 3-(3',5'-di-tertbutyl-4'-hydroxyphenyl) propionate, 0.40 parts tris (mono-nonylphenyl) phosphite, 0.14 parts oleic acid, 0.034 parts potassium hydroxide, and 1.0 parts water. An additional 9.6 parts of water is added in the form of rinses. The stabilized polymer emulsions of these core-shell polymers have a solids content of 40.1%.

The particle size of the emulsion polymer particles of core-shell polymers of Examples 2-4 all are within the range of 150 to 300 nanometers.

TABLE III

Series of Core-Shell Polymers Having Cores 1A or 1E and
Variable Wt. % Outer Shell
(Outer Stage Composition is 71 MMA/29 Styrene Copolymers)

| Example | CORE | CORE TSI | OUTER SHELL (%)[1] |
|---|---|---|---|
| High Swell Ratio/Variable Outer Shell % | | | |
| 3A | 1A | 18.4 | 10 |
| 2B | 1A | 18.4 | 15[2] |
| 2A | 1A | 18.4 | 20[2] |
| 2G | 1A | 18.4 | 25[2] |
| Low Swell Ratio/Variable Outer Shell % | | | |
| 4A | 1E | 8.25 | 10 |
| 2F | 1E | 8.25 | 15[3] |
| 4B | 1E | 8.25 | 20 |
| 2K | 1E | 8.25 | 25[3] |

NOTES:
[1]Outer shell % is weight % of total core-shell polymer weight.
[2]Examples 2B, 2A, and 2G are included from Table II as part of the outer stage variation series with core 1A.
[3]Examples 2F and 2K are included from Table II as part of the outer stage variation series with core 1E.

EXAMPLE 5

Preparation of Acrylic/Alpha-Methylstyrene Matrix Copolymer

A thermoplastic matrix copolymer of approximately 74.4 wt. % MMA, 23.4% alpha-methyl-styrene, 2.0% ethyl acrylate, and 0.3% n-dodecyl mercaptan of approximately 110,000 weight average molecular weight (Mw) is prepared by emulsion polymerization: 250 parts of a polymer latex is prepared from 74 parts of MMA, 24 parts of alpha-methylstyrene, 2 parts of ethyl acrylate, 150 parts water, 0.3 part n-dodecyl mercaptan, 0.39 part sodium dodecylbenzene-sulfonate and 0.13 part sodium persulfate. The reaction is conducted under nitrogen at 85 deg. C during a period of 120 minutes. The resulting polymer solids of the converted matrix copolymer is approximately 40.1 wt. %.

Polymer blends are prepared by admixing the stabilized emulsion of a given core-shell polymer, prepared as described in Examples 2 through 4, with the emulsion of the matrix copolymer described in Example 5, followed by isolation and test-piece molding and testing.

EXAMPLE 6

Preparation of Polymer Blend of the Core-Shell Polymer of Example 2A and the Acrylic/alpha-methylstyrene Matrix Copolymer of Example 5

To 70 parts (based on solids content) of the copolymer emulsion of Example 5 is added 30 parts (also based on solids) of the core-shell polymer emulsion particles of Example 2A, and the mixture is briefly mixed. The resulting emulsion blend is freeze-dried as described previously. This treatment results in a polymer blend having 70 wt. % matrix copolymer of Example 5 and 30 wt. % of the core-shell polymer particles of Example 2A. The butadiene content of Example 6, that is, the calculated wt. % of butadiene polymer contributed by the butadiene content of the core-shell polymer to the total weight of the polymer blend, is 21.5 weight percent.

This powdered blend is extruded conventionally through a 2.5 cm single screw, Killion extruder and cooled, pelletized, and dried as described previously. The polymer blend is injection molded as described previously and tested, using the tests described previously.

The Example 6 polymer blend gives clear, high-gloss molded parts, which show an annealed heat distortion temperature of 111 deg. C., and good tensile strength and modulus. For example, notched Izod impact strength at 23 deg. C. is 120 Joules/Meter (120 J/M), and at 0 deg. C. is 95.6 J/M. The Gardner falling dart (F50) impact strength is 73 Kg-cm. Tensile impact strength is 141 Kg-cm per square cm. The % haze and % luminous transmittance are 5.2 and 88.6, respectively; and the Yellowness Index is 9.9.

EXAMPLES 7-9

Preparations of Polymer Blends Having Core-Shell Polymers with Rubber Core 1A and Variable Outer Shell Levels; Comparative Examples 9 C-1 through 9 C-4

By using substantially identical procedures described for Example 6, the polymer blends of Examples 7-9 are prepared. The blends are based on the Example 5 matrix copolymer and the series of core-shell polymers of Table III having variable % outer shells on a common core, Example 1A, with 18.4 TSI. In preparing the blends of Examples 7-9 by the procedures of Example 6, adjustments to the charges of the core-shell polymer and matrix copolymer emulsions are made so as to maintain constant the level of butadiene content (at approximately 21 weight % of the total blend weight, as in Example 6) contributed by the core-shell polymer. By holding the "rubber core" level constant in Examples 6-9, more meaningful data are believed to be obtained for comparative purposes than by the data obtained with blends in which, for example, the total core-shell polymer weight is held constant. Composition, blend component ratios, and some of the resulting physical property data for the polymer blends of Examples 6-9 are summarized in Table IV. The blends of Examples 6-9 had Yellowness Indices within the range of 8 to 11.

Polymer blends of comparative examples, Examples 9 C-1 through 9 C-4 also are prepared using essentially identical procedures to those used in preparing Example 9, all using core-shell polymers having 25 wt. % outer shell (core-shell examples 2H through 2K of Table II) but on rubber cores of diminishing swell ratio (Cores 1B through 1E). Compositions of the polymer blends of comparative examples 9 C-1 through 9 C-4 are included in Table IV with some of their resulting physical properties.

The data in Table IV show that there is a range of percent outer shell level on a relatively high swell ratio (TSI 18.4) rubber core, in which outer shell range almost all properties are simultaneously optimized. That is, Izod impact strength at 23 deg. C. exceeds 60 J/M and tensile strength exceeds 120 Kg-cm/cm$^2$, these values obtained simultaneously with low haze (less than about 10%) and good luminous transmittance (LT exceeding 88%) in Examples 6, 7, and 9. Data for the comparative examples, 9 C-1 through 9 C4, on the other hand, show that impact properties, particularly notched Izod, Gardner falling dart, and tensile impact, are all low regardless of the swell index when the wt. % of the outer shell is held constant at 25%. (This result shows that it is not sufficient alone to have a rubber core with a swell index in the desired range to achieve optimum impact values.) The most effective range for the examples shown in Table IV is that range bounded by approximately 16 to about 24 weight % outer shell on a rubber core having a swell ratio of 18.4 TSI.

TABLE IV

Composition and Properties of Polymer Blends with A Constant Core Swell Ratio (18.4) and Variable % Outer Shell (Ex. 6-9) and Appropriate Comparative Examples

| Example | Composition (% Ex 5/% Ex )[1] | Core TSI | % Wt. Outer Shell | Izod Impact, J/M 23° C. | Izod Impact, J/M 0° C. | Falling Dart (F50; Kg-cm) | Tensile (Kg-cm/cm$^2$) | % Haze/ % LT[2] |
|---|---|---|---|---|---|---|---|---|
| 6 | 70/30, 2A | 18.4 | 20 | 120 | 95.6 | 73 | 141 | 5.2/88.6 |
| 7 | 72/28, 2B | 18.4 | 15 | 122 | 97 | 25 | 139 | 11/88.1 |
| 8 | 73/27, 3A | 18.4 | 10 | 79 | 48 | 23 | 103 | 23/86.5 |
| 9 | 68/32, 3B | 18.4 | 25 | 59 | 23 | 69 | 122 | 3.4/89.1 |
| 9C-1 | 68/32, 2H | 14.6 | 25 | 55.5 | 42 | 29 | 56 | 2.7/90 |
| 9C-2 | 68/32, 2I | 12.9 | 25 | 51 | 42 | 38 | 73 | 2.5/90.5 |
| 9C-3 | 68/32, 2J | 10.7 | 25 | 41 | 35 | 35 | 64 | 3.2/90 |
| 9C-4 | 68/32, 2K | 8.25 | 25 | 49 | 42 | 33 | 75 | 3.3/90.2 |

NOTES:
[1] Composition % is the weight % of total polymer blend, based on the solid components; % matrix copolymer of EX. 5 and % Core-shell polymer of the Core-shell polymer Example designated.
[2] % Haze and % LT are % Haze and % Luminous Transmittance as measured by ASTM Method D-1003.

EXAMPLES 10-13

Preparations of Polymer Blends With Core-Shell Polymers Having 15% Outer Shell and Variable Rubber Core Swell Ratios; Comparative Examples 10 C-1 and 10 C-2 higher swell ratio. Example 10, the blend with the same low TSI core and 15 wt. % outer shell, also is less effective, like its comparative analogs. The most effective TSI range in these examples is that bounded by approximately 10 to 25 TSI swell ratio when the core-shell polymer has an outer shell level of 15 wt. %.

TABLE V

Composition and Properties of Polymer Blends with A Constant Core Swell Ratio (18.4) and Variable % Outer shell (Ex's. 10-13, 7) and Appropriate Comparative Examples (Ex's 10, C-1 and C-2)

| Example | Composition (% Ex 5/% Ex )[1] | Core TSI | % Wt. Outer Shell | Izod Impact, J/M 23° C. | Izod Impact, J/M 0° C. | Falling Dart (F50; Kg-cm) | Tensile (Kg-cm/cm$^2$) | % Haze/ % LT[2] |
|---|---|---|---|---|---|---|---|---|
| 10 | 72/28, 2F | 8.25 | 15 | 74 | 54.5 | 37 | 56 | 4.7/90.2 |
| 11 | 72/28, 2E | 10.7 | 15 | 90 | 50 | 37 | 84 | 5.2/90.2 |
| 12 | 72/28, 2D | 12.9 | 15 | 116 | 91 | 45 | 86 | 5.4/90 |
| 13 | 72/28, 2C | 14.6 | 15 | 132 | 105 | 58 | 111 | 7.5/89 |
| 7[3] | 72/28, 2B | 18.4 | 15 | 122 | 97 | 25 | 139 | 11/88 |
| 10 C-1 | 73/27, 4A | 8.25 | 10 | 77 | 62 | 41 | 66 | 8/90 |
| 10 C-2 | 68/32, 2K | 8.25 | 25 | 49 | 42 | 33 | 75 | 3.3/90.2 |

Notes:
[1]Composition % is the wt. % of total polymer blend, based on solid components; % matrix copolymer of Example 5 and % Core-shell polymer of the Example designated.
[2]% Haze and % LT are % Haze and % Luminous Transmittance as measured by ASTM Method D-1003.
[3]Example 7, as in Table IV, is included here, completing the 15% outer shell series.

By using substantially identical procedures of Ex. 6, the polymer blends of Examples 10-13 are prepared. These blends are based on the Ex. 5 matrix copolymer and the series of core-shell polymers of Table II having 15 wt. % outer shells and cores of variable swell ratios. In preparing the blends of Examples 10-13 by the procedures of Ex. 6 and Examples 7-9, adjustments in the core-shell polymer and matrix copolymer ratios are made so as to maintain constant the level of butadiene polymer content (at approximately 21 weight % of the total blend weight as in Ex's 6-9) contributed by the core-shell polymer. By holding the "rubber core" level constant, more meaningful data are believed to be obtained for comparative purposes than by the data obtained with blends in which, for example, the total core-shell polymer weight is held constant. Composition, blend component ratios, and some of the resulting physical property data for the polymer blends of the series of Examples 10-13, and related Example 7, are summarized in Table V. The polymer blends of Examples 10-13 had Yellowness Indices within the range of 8-11.

Polymer blends of comparative examples 10 C-1 and 10 C-2 are prepared using essentially identical procedures to those used in preparing Example 10, using the same rubber core (1E, TSI 8.25) and core-shell polymers having variable wt. % outer shells as defined by core-shell examples 4A and 2K (10 and 25 wt. % outer shells, respectively). Compositions of Examples 10 C-1 and 10 C-2 are also summarized in Table V, with some of their resulting physical properties.

The data in Table V show that there is a range of TSI (swell index) of the core rubber, at 15 wt. % outer shell stage level, in which TSI range almost all properties are simultaneously optimized. That is, Izod impact strength at 23 deg. C. exceeds 80 J/M and tensile impact strength exceeds 80 Kg-cm/cm$^2$ (and increases as swell ratio increases), these values obtained simultaneously with low haze, less than about 11%, and good luminous transmittance (LT exceeding 88%). Data for comparative examples, on the other hand, show that low (10%) and high (25%) outer shell levels on low swell ratio rubber cores do not provide the same high levels of impact strength imparted by similar examples having

EXAMPLE 14

Preparation of Polymer Blend with a Core-Shell Polymer Having a Core TSI of 12.5 and a 15% Outer Shell, and a MMA/Sty/alpha-methyl styrene Terpolymer Matrix This example illustrates the effectiveness of the modifier of the present invention for improving the toughness of clear, unmodified methyl methacrylate/-styrene/a-methyl styrene terpolymer.

A. In a manner similar to that of example 1, an MBS core rubber particle was prepared using 3.65 parts of a seed polymer consisting of 93.3 parts butadiene, and 6.7 parts styrene (90 nm particle size), to which is added 96.7 parts of a mixture of 89.2 parts butadiene, and 6.4 parts styrene (containing 0.6% n-dodecyl mercaptan) in feed 1, then 3.0 parts methyl methacrylate and 1.3 parts styrene (containing 0.2% mercaptan) in feed 2, giving a rubber core particle of 205 nm and a toluene swell ratio of 12.5.

B. In a manner similar to that of example 2, a core-shell particle was prepared by using 85.0 parts rubber core and 15.0 parts outer shell of 70.0 parts methyl methacrylate and 30.0 parts styrene using the procedure of example 2. The final core-shell polymer had an average particle size of 228 nm.

C. In a manner similar to that of example 5, a thermoplastic matrix copolymer of 58.0 parts methyl methacrylate, 22.2 parts a-methyl styrene, 19.8 parts styrene and 0.1 parts n-dodecyl mercaptan was prepared by emulsion polymerization giving a polymer of 189,000 Mw.

To 70 parts of the thermoplastic emulsion terpolymer (C., based on solids) is added 30 parts of the core-shell MBS modifier emulsion (B., based on solids), and the mixture is briefly mixed, yielding a blend containing 23.0%, on solids, butadiene content. The resulting emulsion blend material was freeze dried, extruded, and molded as previously described to give a transparent sample which showed an annealed heat distortion temperature (ASTM test D-648, 4 hr at 100° C.) of 111 deg. C., and good tensile strength and modulus. Additional impact properties are shown in Table VI.

TABLE VI

| | | | Impact Properties of Example 14 Blend | | | |
|---|---|---|---|---|---|---|
| Example | Outer-Stage (%)[1] | TSI | Notched Izod Impact at 23° C. (J/M) | Notched Izod Impact at 0° C. (J/M) | Gardner Falling Dart F50 Impact (Kg-cm) | Dynatup Falling Dart Total Energy to Fail (Kg-cm)[2] |
| 14 | 15.0 | 12.5 | 183 | 147 | 103 | 245 |

NOTES:
[1]Percent outer stage based on total core-shell polymer.
[2]Dynatup total energy-to-failure (Kg-cm).

EXAMPLE 15

Preparation of a Polymer Blend with a Core-Shell Polymer having a Core TSI of 9.5 and a 15% Outer Shell of a 53 MMA/47 Sty Composition, and a MMA/Styrene Copolymer Matrix This example illustrates the effectiveness of the modifier of the present invention for improving the toughness of clear, unmodified methyl methacrylate/styrene copolymer.

A. In a manner similar to that of example 1, an MBS core rubber particle was prepared using 5.4 parts of a seed polymer consisting of 70 parts butadiene, and 28 parts styrene and 2 parts MMA (62 nm particle size), to which is added 88.6 parts of a mixture of 74.0 parts butadiene, and 26.0 parts styrene (containing 0.6% n-dodecyl mercaptan) in feed 1, then 6.0 parts of a mixture of 55 parts methyl methacrylate and 45 parts styrene (containing 0.6% mercaptan) in feed 2, giving a rubber core particle of 175 nm and a toluene swell ratio of 9.5.

B. In a manner similar to that of example 2, a core-shell particle was prepared by using 85.0 parts rubber core and 15.0 parts outer shell of 52.9 parts methyl methacrylate and 47.1 parts styrene using the procedure of example 2. The final core-shell polymer had an average particle size of 181 nm.

C. In a manner similar to that of example 5, a thermoplastic matrix copolymer of 52.9 parts methyl methacrylate, 47.1 parts styrene and 0.1 parts n-dodecyl mercaptan was prepared by emulsion polymerization giving a polymer of 148,000 Mw.

To 57.1 parts of the thermoplastic emulsion copolymer of 15C (based on solids) is added 42.9 parts of the core-shell MBS modifier emulsion (B., based on solids), and the mixture is briefly mixed. The resulting emulsion blend material was freeze dried, extruded, and molded as previously described to give a transparent sample (at 25.3% butadiene level on total blend weight) which showed an annealed heat distortion temperature (ASTM test D-648, 4 hr at 100° C.) of 78 deg. C., and good tensile strength and modulus. Additional impact and optical properties are shown in Table VII.

EXAMPLE 16

Preparation of a Polymer Blend With a Core-Shell Polymer Having a Core TSI of 9.5 and a 20% Outer Shell of 53 MMA/47 Sty Composition, and a MMA/Styrene Matrix This example illustrates the effectiveness of the modifier of the present invention at a slightly higher (20%) outerstage level in the same matrix polymer as in Example 15, at the same butadiene level. The 15-20% outer stage levels of examples 15 and 16 represent a range where impact and clarity are simultaneously at useful and effective levels.

Using 80.0 parts of the identical rubber core particle described in example 15, 20.0 parts of the same monomer mixture was outer-staged using the procedure of example 15. The final core-shell polymer had an average particle size of 183 nm.

To 54.5 parts of the same thermoplastic emulsion copolymer of example 15C is added 45.5 parts of the core-shell MBS modifier emulsion, and the mixture is briefly mixed. The resulting emulsion blend material was freeze dried, extruded, and molded as previously described to give a transparent sample (at 25.3% butadiene level on total blend weight) which showed an annealed heat distortion temperature (ASTM test D-648, 4 hr at 100° C.) of 82 deg. C., and good tensile strength and modulus. Additional impact and optical properties are shown in Table VII.

EXAMPLE 17

Preparation of a Comparative Polymer Blend with a Core-Shell Polymer Having a Core TSI of 7.3 and a 20% Outer Shell of a 53 MMA/47 Styrene Composition, and a MMA/Styrene Copolymer Matrix This comparative example illustrates that a lower swell modifier of composition similar to that of example 16, has generally poorer impact properties.

A. In a manner similar to that of example 1, an MBS core rubber particle was prepared using 3.8 parts of a seed polymer consisting of 70 parts butadiene, and 28 parts styrene and 2 parts MMA (62 nm particle size), to which is added 96.2 parts of a mixture of 74.0 parts butadiene, and 26.0 parts styrene (containing no n-dodecyl mercaptan) giving a rubber core particle of 186 nm and a toluene swell ratio of 7.3.

B. In a manner similar to that of example 16, a core-shell particle was prepared by using 80.0 parts rubber core and 20.0 parts outer shell of 52.9 parts methyl methacrylate and 47.1 parts styrene using the procedure of example 16. The final core-shell polymer had an average particle size of 192 nm.

To 57.3 parts of the thermoplastic emulsion copolymer described by Example 15C (based on solids) is added 42.7 parts of the core-shell MBS modifier emulsion (B., based on solids) and the mixture is briefly mixed. The resulting emulsion blend material was freeze dried, extruded, and molded as previously described to give a transparent sample (at 25.3% butadiene level on total blend weight) which showed an annealed heat distortion temperature (ASTM test D-648, 4 hr at 100° C.) of 83 deg. C., and good tensile strength and modulus. Notched Izod properties were lower than those of examples 15 and 16. Additional impact and optical properties are shown in Table VII.

TABLE VII

| | | | Impact Properties of Examples 15, 16 and 17 | | | | |
|---|---|---|---|---|---|---|---|
| Example | Outer-Stage (%)[1] | TSI | Notched Izod Impact at 23° C. (J/M) | Notched Izod Impact at 0° C. (J/M) | Dynatup Falling Dart Impact Energy (Kg-cm) | Unnotched Izod Impact at 23° C. (J/M)[2] | % Haze/% LT/ Yi[3] |
| 15 | 15 | 9.5 | 228 | 123 | 298 | Brittle/Duct. 20%  80% 1300  1900 | 15.4/74.4/+10.4 |
| 16 | 20 | 9.5 | 126 | 74 | 368 | Brittle/Duct. 0%  100% 1860 | 8.5/75.6/+10.9 |
| 17[4] | 20 | 7.3 | 85 | 52 | 314 | Brittle/Duct. 40%  60% 1310  1830 | 2.6/76.6/+7.6 |

NOTES:
[1]Weight percent outer stage based on total core-shell polymer weight.
[2]% Brittle break (Value), % Ductile break (Value), ⅛" samples.
[3]Percent haze and Percent luminous transmittance were determined on a Gardner Hazemeter, Yellowness Index (Yi) determined on a Hunter Colorimeter.
[4]Example 17 is a comparative example.

While the invention has been described and exemplified in great detail, alternative embodiments, alterations and improvements should become apparent without departure from the spirit and scope of the invention.

We claim:

1. A polymer blend, comprising:
   a) from about 55 to about 95 weight percent of an acrylic/vinyl aromatic matrix copolymer, and
   b) from about 5 to about 45 weight percent of particles of a core-shell polymer comprising:
      i) a core of from about 70 to about 95 weight %, based on the core-shell polymer weight, of a crosslinked polymer derived from at least 50 weight %, based on the core, of a conjugated diolefin monomer, up to about 50 weight % of at least one vinyl comonomer, and up to about 5 weight % of a polyvinyl monomer, the core having a toluene swell ratio of from about 7 to about 25, and
      ii) at least one polymer shell of from about 5 to about 25 weight %, based on the core-shell polymer weight, of a polymer derived from at least one vinyl aromatic monomer or of a copolymer derived from a vinyl aromatic monomer and at least one comonomer selected from a vinyl aromatic, a lower alkyl acrylate, a lower alkyl methacrylate, or a polyvinyl monomer; wherein the core-shell particles have an average particle diameter less than about 400 nanometers and wherein the polymer blend has a luminous transmittance greater than about 85%.

2. The polymer blend of claim 1 wherein the acrylic/vinyl aromatic matrix copolymer comprises one or more lower alkyl acrylate or lower alkyl methacrylate monomers, wherein lower alkyl has from 1 to 8 carbon atoms.

3. The polymer blend of claim 2 wherein the matrix copolymer comprises one or more styrene or alpha-lower alkylstyrene monomers, wherein lower alkyl has from 1 to 8 carbon atoms.

4. The polymer blend of claim 3 wherein the matrix copolymer contains alpha-methyl styrene, methyl methacrylate and lower alkyl acrylate.

5. The polymer blend of claim 1 wherein the polymer core comprises conjugated diolefin monomers selected from butadiene, isoprene, chloroprene, or dimethylbutadiene.

6. The polymer blend of claim 5 wherein the polymer core contains butadiene.

7. The polymer blend of claim 5 wherein the core further comprises lower alkyl acrylate, lower alkyl methacrylate, and a vinyl aromatic.

8. The polymer blend of claim 7 wherein the lower alkyl methacrylate is methyl methacrylate.

9. The polymer blend of claim 1 wherein the vinyl aromatic monomer is from about 10 to about 50 weight % of the shell.

10. The polymer blend of claim 1 wherein the shell is a vinyl aromatic copolymer containing styrene and at least one of the units of alpha-methyl styrene or methyl methacrylate.

11. The polymer blend of claim 1 wherein the particles have one or more additional polymer shells derived from at least one vinyl aromatic monomer or of a copolymer derived from monomers selected from a vinyl aromatic, methyl methacrylate, or a polyvinyl monomer.

12. The polymer blend of claim 10 wherein the shell has from about 25 to about 35 weight % styrene and from about 65 to about 75 weight % methyl methacrylate, based on the total weight of the shell.

13. The polymer blend of claim 1 wherein the at least one shell is from about 12 to about 25 weight % of the core-shell polymer and the toluene swell ratio of the core is from about 10 to about 25.

14. The polymer blend of claim 13 wherein the shell is from about 15 to about 22 weight % of the core-shell polymer and the toluene swell ratio is from about 12 to about 20.

15. An injection molded, extruded, or blow-molded article prepared from the blend of claim 1.

* * * * *